United States Patent
Letizio et al.

(10) Patent No.: US 11,590,819 B2
(45) Date of Patent: Feb. 28, 2023

(54) CAIRS WITH INTEGRATED FAST DOWN LEVELING VALVES

(71) Applicant: Continental Automotive Systems, Inc, Auburn Hills, MI (US)

(72) Inventors: Matthew Letizio, Farmington Hills, MI (US); Gerald Geck, Livonia, MI (US); Daniel Goodrich, Cedarville, MI (US); Matthew Tuhro, Sault Ste. Marie, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 155 days.

(21) Appl. No.: 16/898,163

(22) Filed: Jun. 10, 2020

(65) Prior Publication Data

US 2021/0387500 A1    Dec. 16, 2021

(51) Int. Cl.
*B60G 17/015* (2006.01)
*B60G 17/052* (2006.01)
*B60G 17/056* (2006.01)

(52) U.S. Cl.
CPC ..... *B60G 17/0525* (2013.01); *B60G 17/0155* (2013.01); *B60G 17/0565* (2013.01); *B60G 2202/152* (2013.01); *B60G 2500/2012* (2013.01); *B60G 2500/2014* (2013.01)

(58) Field of Classification Search
CPC ............ B60G 17/0155; B60G 17/0525; B60G 17/0523; B60G 17/056; B60G 17/0565; B60G 2500/2021; B60G 2500/2013
See application file for complete search history.

(56) References Cited

U.S. PATENT DOCUMENTS

| | | | |
|---|---|---|---|
| 4,695,074 A | | 9/1987 | Kobayashi et al. |
| 4,834,418 A | | 5/1989 | Buma |
| 4,836,511 A | * | 6/1989 | Buma .................. B60G 17/033 280/124.157 |
| 5,271,632 A | * | 12/1993 | Glaser ...................... B60G 9/02 280/124.112 |
| 5,678,900 A | * | 10/1997 | Blanz ................. B60G 17/0523 137/115.19 |

(Continued)

FOREIGN PATENT DOCUMENTS

| | | | |
|---|---|---|---|
| DE | 4228739 A1 * | 3/1993 | ......... B60G 17/0424 |
| DE | 102005010297 A1 * | 10/2006 | ........... B60G 21/103 |

(Continued)

OTHER PUBLICATIONS

International Search Report and the Written Opinion of the International Searching Authority dated Sep. 14, 2021, for the counterpart PCT Application No. PCT/US2021/070687.

*Primary Examiner* — Barry Gooden, Jr.

(57) ABSTRACT

An air suspension system includes an air supply system block including one or more air spring valves, where the one or more air spring valves are disposed within the air supply system block, the air supply system block having a valve block housing. The system further includes the air supply system block pneumatically coupled with one or more air springs, and at least one reservoir coupled with the air supply system block, at least one motor and pump disposed within the air supply system block. The air suspension further includes fast down leveling valves disposed within the air supply system block.

8 Claims, 4 Drawing Sheets

(56) References Cited

U.S. PATENT DOCUMENTS

| | | | | |
|---|---|---|---|---|
| 6,148,862 | A * | 11/2000 | Doll | B60G 17/0408 137/271 |
| 6,213,485 | B1 * | 4/2001 | Doll | B60G 17/0408 280/124.16 |
| 7,032,895 | B2 | 4/2006 | Folchert | |
| 7,552,932 | B2 * | 6/2009 | Matern | B60G 17/0155 280/124.16 |
| 8,708,430 | B2 * | 4/2014 | Bensch | B60T 17/083 303/113.4 |
| 9,834,053 | B2 * | 12/2017 | Frank | B60G 17/0528 |
| 10,017,025 | B2 * | 7/2018 | Reuter | B60G 17/018 |
| 10,391,830 | B2 * | 8/2019 | Bohn | F04B 53/10 |
| 2010/0138116 | A1 * | 6/2010 | Coombs | B60G 17/0523 701/48 |
| 2013/0249175 | A1 * | 9/2013 | Ellifson | B60G 17/056 280/6.157 |
| 2014/0375002 | A1 * | 12/2014 | Coombs | B60R 16/02 280/6.157 |
| 2015/0137463 | A1 * | 5/2015 | McLennan | B60G 17/052 280/6.153 |
| 2015/0151599 | A1 * | 6/2015 | Schallmeier | F16F 9/0281 701/37 |
| 2017/0036505 | A1 | 2/2017 | Bohn et al. | |
| 2019/0111753 | A1 * | 4/2019 | Reuter | B60G 17/0525 |
| 2020/0056718 | A1 | 2/2020 | Hein | |
| 2020/0269645 | A1 * | 8/2020 | Reuter, II | F04B 41/02 |

FOREIGN PATENT DOCUMENTS

| | | | |
|---|---|---|---|
| DE | 102015219613 A1 | 4/2017 | |
| DE | 102015219618 A1 | 4/2017 | |
| EP | 0816142 A1 * | 1/1998 | B60G 17/056 |
| JP | H01218911 A | 9/1989 | |

* cited by examiner

CAIRS WITH INTEGRATED FAST DOWN LEVELING VALVES

TECHNICAL FIELD

The disclosure herein relates to an air suspension system with fast down leveling valves.

TECHNICAL BACKGROUND

OEM companies which manufacture automotive vehicles typically select suspension and driveline components which offer the best compromise of comfort and performance. Suspension systems for automotive vehicles provide vehicle passengers with a more comfortable ride. Air suspension systems utilize air springs, rather than traditional coil springs, and provide different suspension qualities that may be preferable to traditional coil spring suspensions in some vehicles.

A conventional air spring is a device that is arranged between a vehicle body and chassis, such that the air spring applies what is referred to as a "normal load" to a respective wheel. The air spring system can be used to lower a vehicle from any ride height to an entry/exit ride height. It is desirable to also include a fast down leveling system to achieve faster lowering events. Currently to perform fast down leveling, the OEM must package both the air supply valve block 80 and the fast down leveling block 82 separately along with the wiring harness 84 and air lines 86 to each of the valve blocks 80, 82 (See FIGS. 1 and 2). Air lines 90 extend from the air supply valve block 80 to less than all air springs, and air lines 92 extend from the fast down leveling block 82 to less than all air springs. The configuration results in a large footprint within the vehicle as well as additional air lines and wire harnesses.

What is needed is a better way to provide a single solution to the OEMs who require air suspension with fast down leveling.

BRIEF SUMMARY

An air suspension system includes an air supply system block including one or more air spring valves, where the one or more air spring valves are disposed within the air supply system block, the air supply system block having a valve block housing. The system further includes the air supply system block pneumatically coupled with one or more air springs, and at least one reservoir coupled with the air supply system block, at least one motor and pump disposed within the air supply system block. The air suspension further includes fast down leveling valves disposed within the air supply system block.

In one or more embodiments, the at least one reservoir includes a main reservoir and a secondary reservoir.

In one or more embodiments, the air suspension system is a closed air system.

In one or more embodiments, the air suspension system is an open air system.

In one or more embodiments, the fast down leveling valves are entirely disposed within the air supply system block.

In one or more embodiments, at least one ambiance valve is disposed within the air supply system block.

In one or more embodiments, the at least one ambiance valve disposed exhausts to outside of the air supply system block.

In one or more embodiments, one or more reversing valves is disposed within the air supply system block.

In one or more embodiments, the one or more reversing valves are coupled between the one or more air spring valves and the at least one motor and pump.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
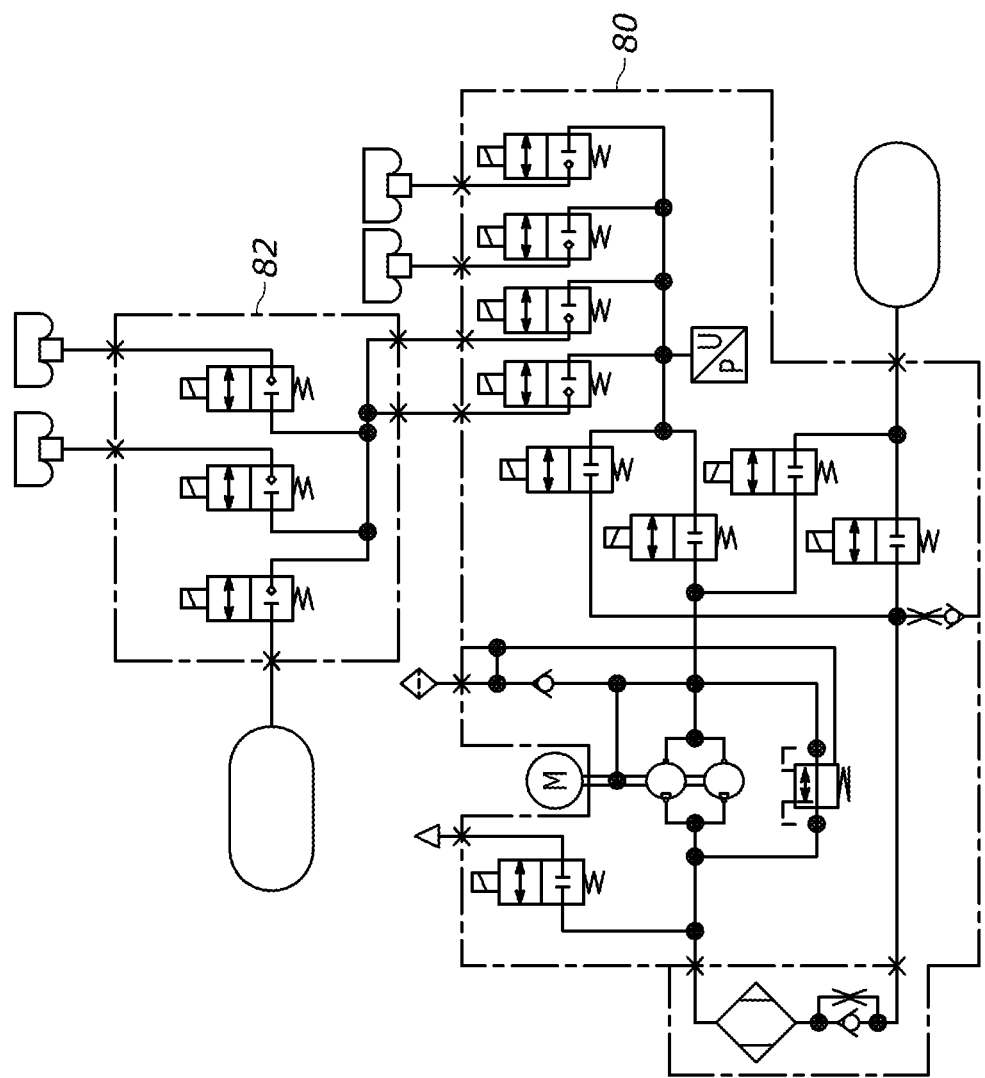
FIG. 1 illustrates a conventional air suspension system schematic.
Figure 2:
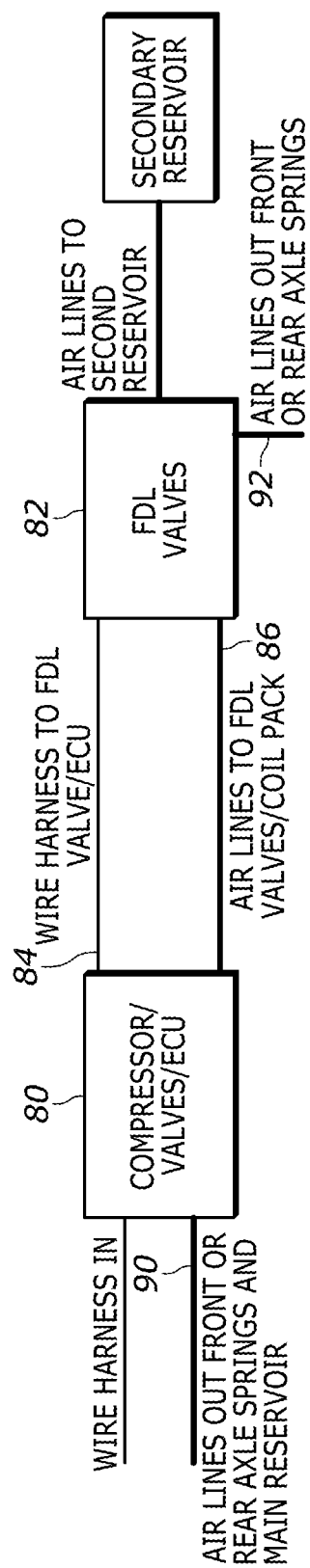
FIG. 2 illustrates a conventional air suspension schematic.
Figure 3:
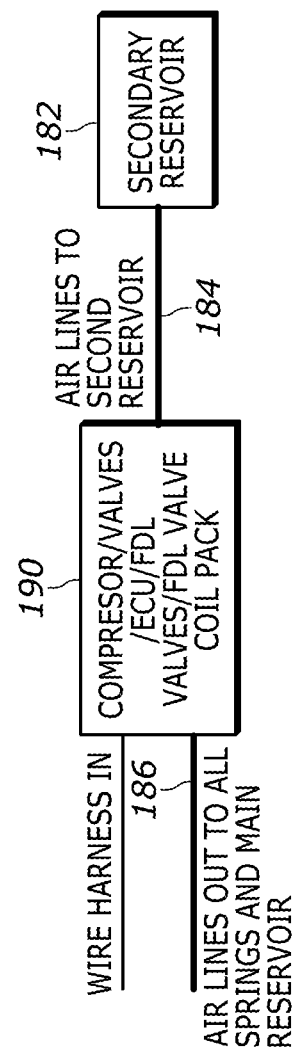
FIG. 3 illustrates an air suspension schematic in accordance with one or more embodiments.
Figure 4:
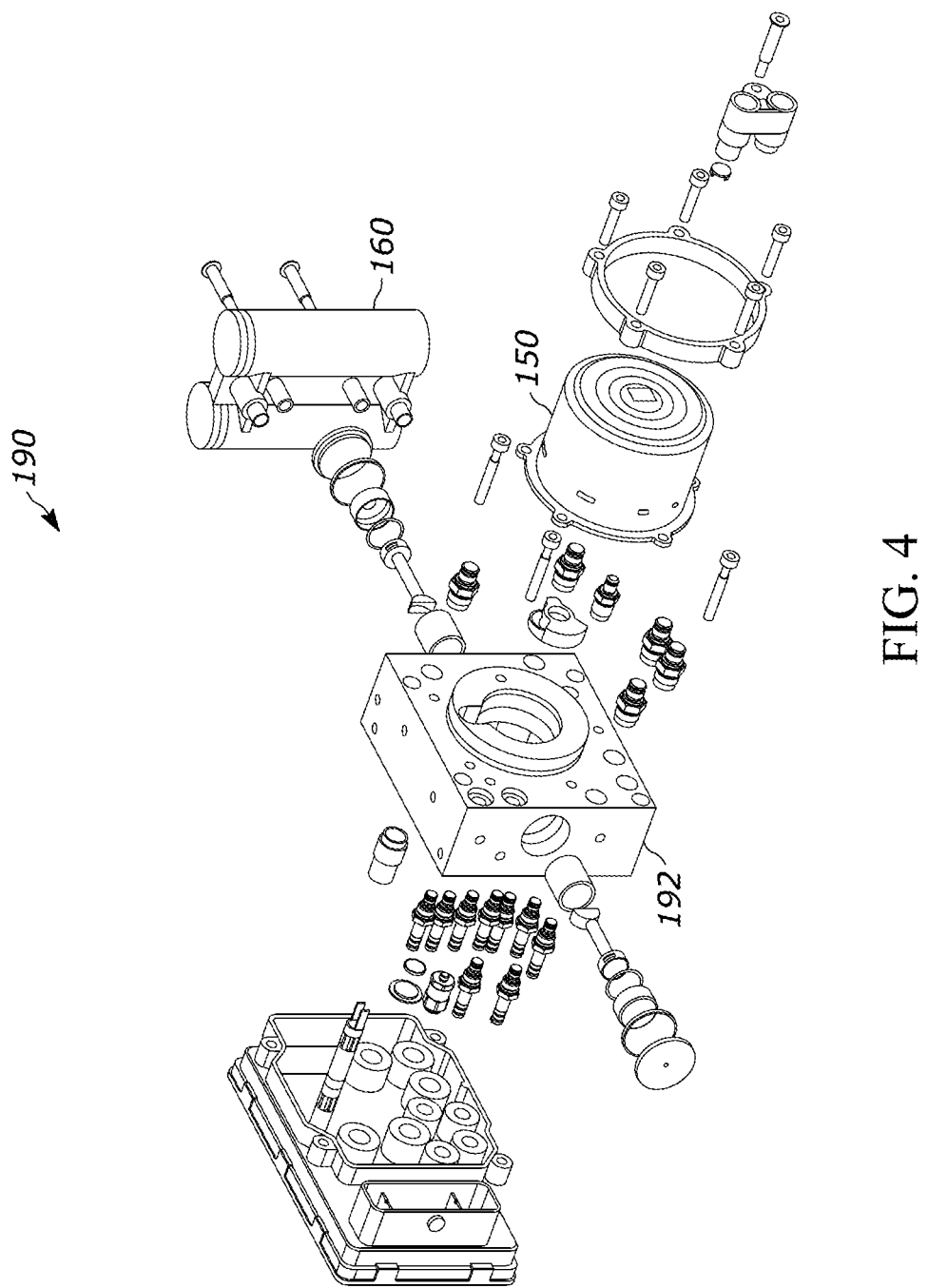
FIG. 4 illustrates a partial perspective of an air supply system in accordance with one or more embodiments.
Figure 5:
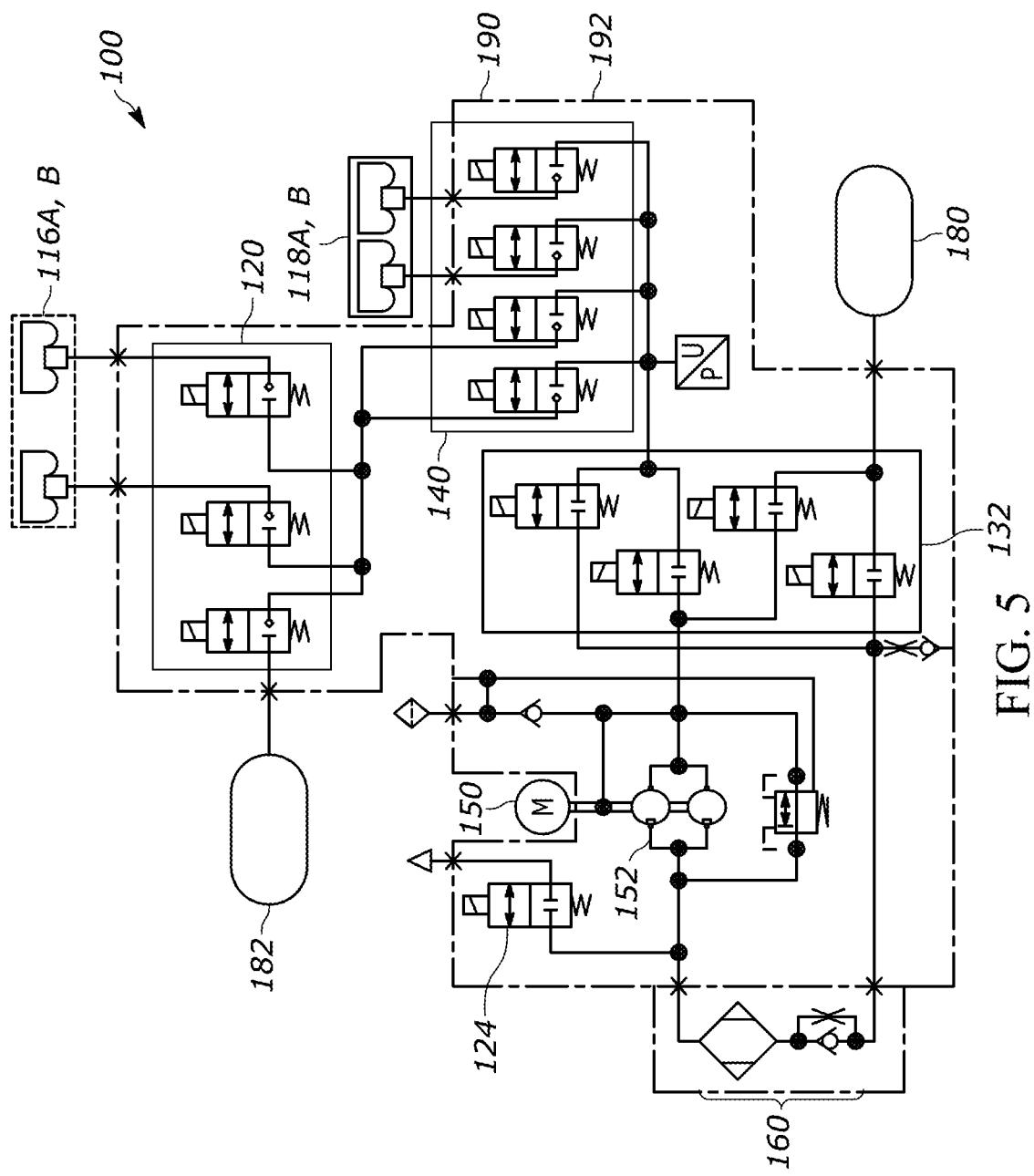
FIG. 5 illustrates a novel conventional air suspension system schematic, as constructed in accordance with one or more embodiments.

An air suspension system 100 includes an air supply system block 190 including one or more air spring valves 140, where the one or more air spring valves 140 are disposed within the air supply system block 190, the air supply system block 190 having a valve block housing 192. Referring generally to FIGS. 3-5, the system 100 further includes the air supply system block 190 pneumatically coupled with one or more air springs 116A, 116B, 118A, 118B, and at least one reservoir, such as a main reservoir 180 or a secondary reservoir 182, coupled with the air supply system block 190, at least one motor 150 and pump 152 disposed within the air supply system block 190, and at least one dryer 160, where the at least one dryer 160 is disposed adjacent to and/or mounted to a side of the block 190. The air suspension system 100 further includes a fast down leveling system including fast down leveling valves 120 disposed within the air supply system block 190. In one or more embodiments, the fast down leveling valves 120 are entirely disposed within the air supply system block 190. In one or more embodiments, air lines 186 extend from the air supply system block 190 to the main reservoir 180 and all air springs 116A, 116B, 118A, 118B. In one or more embodiments, a second air line 184 is pneumatically coupled between the air supply system block and the secondary reservoir. In one or more embodiments, the air suspension system is a closed air system. In one or more embodiments, the air suspension system is an open air system.

Referring to FIGS. 4-5, the air suspension system is shown generally at 100, and includes an air compressor system having a motor 150 and pump 152, which is in fluid communication with a main reservoir 180. The motor 150 and pump 152 are also in fluid communication with four air spring assemblies, including a first set of air spring assemblies 116A, 116B and a second set of air spring assemblies 118A, 118B. Each of the air spring assemblies 116A, 116B, 118A, 118B is used for absorbing impact during travel of the vehicle, and each air spring assembly 116A, 116B, 118A, 118B, for example can be a multi-chamber air spring assembly, having different spring rates.

Referring now to FIGS. 3-5, a schematic of the air suspension system 100 is shown, including several valves along with the motor 150 and pump 152, and the reservoirs 180, 182, which are part of the air suspension system 100. The air spring valves 140 allow or prevent air flow into the air springs 116A, 116B, 118A, 118B, and the fast down leveling valves 120 allow or prevent air flow into air springs 116A, 116B. The fast down leveling valves 120 allow the air springs 116A, 116B, 118A, 118B to deflate to an empty reservoir 182 to allow the vehicle to lower quickly. The fast down leveling valves 120 also allow the reservoir 182 to be deflated to the main reservoir 180.

In addition, there is at least one ambiance valve 124 disposed within the air supply system block 190 in fluid communication with the valves and in fluid communication with the atmosphere, where the ambiance valve exhausts to outside of the sir supply system block 190. The system 100 further includes one or more reversing valves 132 disposed the air supply system block 190, where optionally the one or more reversing valves 132 are fluidly coupled between the one or more air spring valves 140 and the at least one motor 150 and pump 152. In one or more embodiments, there are four reversing valves. The pump/motor builds pressure in one direction (in the inlet and out of the outlet). The reversing valves 132 redirect (or reverse) air inside the block, so that air can be drawn out of, or pushed into, the various components.

The valves described above include, but are not limited to electromechanical solenoid type valves, which could default to a closed position when they are not energized, and change to an open position when energized. However, it is also contemplated that the valves may also be mechanical valves, such as a check valve, which default to a closed position, and open when a maximum amount of pressure is reached, or normally open valves.

The system 100 allows for significant simplification by eliminating multiple components including, but not limited to, at least one valve block, two air lines, one wire connector and six wires and pins.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. An air suspension system comprising:
a first plurality of air spring valves within an air supply system block, wherein the air supply system block has a valve block housing;
at least one motor;
at least one pump coupled with the at least one motor, wherein the first plurality of air spring valves, the at least one motor, and the at least one pump coupled with the at least one motor are disposed within the air supply system block;
wherein the air supply system block is pneumatically coupled with a plurality of air springs;
a first reservoir connected to the plurality of air springs via the air supply system block;
a second plurality of valves that are reversing valves between the first plurality of air spring valves and the at least one motor coupled to the at least one pump;
a third plurality of valves that are fast down leveling valves disposed within the air supply system block; and
a secondary reservoir connect to at least a portion of the plurality of air springs via the third plurality of fast down leveling valves.

2. The air suspension system as recited in claim 1, further comprising air lines extending from the air supply system block to the first reservoir and all of the air springs.

3. The air suspension system as recited in claim 2, further comprising a second air line pneumatically coupled between the air supply system block and the secondary reservoir.

4. The air suspension system as recited in claim 1, wherein the air suspension system is a closed air system.

5. The air suspension system as recited in claim 1, wherein the air suspension system is an open air system.

6. The air suspension system as recited in claim 1, wherein the fast down leveling valves are entirely disposed within the air supply system block.

7. The air suspension system as recited in claim 1, further comprising at least one ambiance valve disposed within the air supply system block.

8. The air suspension system as recited in claim 7, wherein the at least one ambiance valve exhausts to outside of the air supply system block.

* * * * *